(12) United States Patent
Daikoku

(10) Patent No.: US 10,431,191 B2
(45) Date of Patent: Oct. 1, 2019

(54) METHOD AND APPARATUS FOR ANALYZING CHARACTERISTICS OF MUSIC INFORMATION

(71) Applicant: Tatsuya Daikoku, Leipzig (DE)

(72) Inventor: Tatsuya Daikoku, Leipzig (DE)

( * ) Notice: Subject to any disclaimer, the term of this patent is extended or adjusted under 35 U.S.C. 154(b) by 0 days.

(21) Appl. No.: 16/104,284

(22) Filed: Aug. 17, 2018

(65) Prior Publication Data

US 2019/0189100 A1   Jun. 20, 2019

(51) Int. Cl.
*G10H 1/00* (2006.01)
*G06N 7/08* (2006.01)
*G06F 16/683* (2019.01)

(52) U.S. Cl.
CPC ......... *G10H 1/0008* (2013.01); *G06F 16/683* (2019.01); *G06N 7/08* (2013.01);
(Continued)

(58) Field of Classification Search
CPC .......... G10L 2015/0638; G10H 1/0025; G10H 2210/576; G10H 2210/081;
(Continued)

(56) References Cited

U.S. PATENT DOCUMENTS 4,616,547 A * 10/1986 Mancini .................. B65G 1/14
  84/611
7,323,629 B2 * 1/2008 Somani ................ G10H 1/0008
  700/94

(Continued)

FOREIGN PATENT DOCUMENTS

JP   2001-290474 A   10/2001
JP   2003-015684 A    1/2003
(Continued)

*Primary Examiner* — Marlon T Fletcher
(74) *Attorney, Agent, or Firm* — Konomi Takeshita

(57) ABSTRACT

The purpose of the present invention is to provide a system capable of analyzing intuitively-created improvisation performances without relying on music theories. There is provided an improvisation performance analysis system, comprising: a music information coding section 10 for analyzing and coding music data of an improvisation performer stored in a music storage medium; a tone sequence pattern extraction section 11 for extracting all of first- to n-th-order tone sequence patterns which are likely to occur as n-th Markov chains in order to perform a stochastic analysis with a Markov model using the coded music data; a pitch transition sequence extraction section 12 for obtaining a pitch transition sequence for each of the extracted tone sequence patterns; a transition probability/appearance probability calculation section 13 for using the Markov model to calculate a transition probability of each pitch transition sequence and an appearance probability of each transition sequence at each of the first- to n-th-order hierarchical levels; and an improvisation performance phrase structuring section 14 for rearranging the pitch transition probabilities at each hierarchical level based on the transition probabilities and the appearance probabilities, identifying pitch transition sequences which are statistically likely to occur and expressing the pitch transition sequences in all keys as music scores based on the twelve-tone equal temperament to thereby generate improvisation performance phrases.

14 Claims, 5 Drawing Sheets

(52) U.S. Cl.
CPC . *G10H 2210/061* (2013.01); *G10H 2210/066* (2013.01); *G10H 2210/081* (2013.01); *G10H 2210/086* (2013.01)

(58) Field of Classification Search
CPC ....... G10H 2210/066; G10H 2210/076; G10H 2220/015; G10H 1/20; G10H 1/40; G10H 2210/105; G10H 2210/561; G10H 2240/131; G10H 2240/141; G10H 2250/015; G10H 3/125; G10H 2210/061; G10H 2210/086; G10H 2210/145
See application file for complete search history.

(56) References Cited

U.S. PATENT DOCUMENTS

| | | | | |
|---|---|---|---|---|
| 8,618,401 B2 * | 12/2013 | Kobayashi | ........... | G10H 1/0008 84/609 |
| 2007/0289432 A1 * | 12/2007 | Basu | ...................... | G10H 7/008 84/609 |
| 2009/0071315 A1 * | 3/2009 | Fortuna | ................ | G10H 1/0025 84/609 |
| 2010/0126332 A1 * | 5/2010 | Kobayashi | ............. | G10H 1/383 84/613 |
| 2010/0186576 A1 * | 7/2010 | Kobayashi | ............... | G10H 1/40 84/612 |
| 2010/0307320 A1 * | 12/2010 | Hoeberechts | ........ | G10H 1/0025 84/600 |
| 2011/0000360 A1 * | 1/2011 | Saino | ................... | G10H 1/0008 84/622 |
| 2011/0010321 A1 * | 1/2011 | Pachet | ................ | G10H 1/0025 706/12 |
| 2013/0192445 A1 * | 8/2013 | Sumi | ................... | G10H 1/0008 84/609 |

FOREIGN PATENT DOCUMENTS

| | | |
|---|---|---|
| JP | 2007-225661 A | 9/2007 |
| JP | 2006-508390 A | 3/2016 |

* cited by examiner

Markov transition probabilities

| | 1 | 2 | 3 | 4 | |
|---|---|---|---|---|---|
| 0,2,4,5,7,9 | 10% | 30% | 20% | 40% | =100% |
| 0,-1,-3,-5,-7,8 | 40% | 10% | 30% | 20% | =100% |
| 0,2,4,2,0,-1 | 30% | 20% | 40% | 10% | =100% |

Each row makes up 100%.

FIG. 4A

Appearance probabilities

| | 1 | 2 | 3 | 4 |
|---|---|---|---|---|
| 0,2,4,5,7,9 | 2.5% | 7.5% | 5% | 10% |
| 0,-1,-3,-5,-7,8 | 20% | 5% | 15% | 10% |
| 0,2,4,2,0,-1 | 7.5% | 5% | 10% | 2.5% |

All patterns make up 100%.

FIG. 4B

METHOD AND APPARATUS FOR ANALYZING CHARACTERISTICS OF MUSIC INFORMATION

CROSS REFERENCE TO RELATED APPLICATIONS

This application claims priority under 35 U.S.C. 119 based upon Japanese Patent Application Serial No. 2017-242127, filed on Dec. 18, 2017. The entire disclosures of the aforesaid applications are incorporated herein by reference.

FIELD OF THE INVENTION

The present invention relates to a method and an apparatus for extracting characteristics from music information.

BACKGROUND OF THE INVENTION

One of the important elements of jazz is improvisation.

An improvisation performance refers to an intuitive music performance done without using sheet music prepared in advance, etc. Conventionally, learning improvisation techniques was a time-consuming laborious work involving repeatedly listening to and learning from other performers' past improvisation performances, and copying and practicing the learnt techniques.

Today in contrast, the learners may learn phrases without needing to copy them on their own with the help of many collections of improvisation performance phrases available with interpretations provided by musicologists and musicians based on music theories.

However, learners using the improvisation performance phrase collections prepared by musicologists and musicians based on music theories face difficulties performing outside of rules of the learnt music theories. Thus, those learners' performance patterns would lack varieties, unable to realize genuinely intuitive improvisation performances.

In order to address the above and other challenges, the purpose of the present invention is to provide a system capable of analyzing intuitively-created improvisation performances without relying on music theories, and a method for being executed by the system.

SUMMARY OF THE INVENTION

In order to overcome the above challenge, according to a first principal aspect of the present invention, there is provided an improvisation performance analysis system, comprising: a tone sequence pattern extraction section for analyzing music data storing an actual performance of a performer and extracting all of first- to n-th-order tone sequence patterns; a transition probability/appearance probability calculation section for calculating a transition probability for each of the extracted tone sequence patterns and appearance probabilities for all tone sequence patterns; a performance phrase structuring section for identifying tone sequence patterns which are statistically likely to occur based on the transition probabilities and the appearance probabilities, and expressing the tone sequence patterns as music scores to thereby generate and output performance phrases of the performer.

According to such a configuration, it is possible to extract subconscious knowledge of performers embedded in music and output phrases using information obtained from music improvisationally played by all famous jazz performers based on a neurophysiological brain mechanism of subconscious learning and intuitive generation.

Thus, phrases unrestricted by music theories may be provided.

According to one embodiment of this invention, the performance of the performer is an improvisation performance.

Also, according to another embodiment, the tone sequence pattern extraction section extracts all of first- to n-th-order tone sequence patterns which are likely to occur as n-th Markov chains, and the transition probability/appearance probability calculation section uses a Markov model to obtain a transition probability of each pitch transition sequence at each of the first- to n-th-order hierarchical levels.

According to yet another one embodiment, the music data is in an XML file or from a MIDI sound generator.

According to a second principal aspect of the present invention, there is provided a method for analyzing improvisation performances, comprising the steps of: by a computer, extracting tone sequence patterns by analyzing music data storing an actual performance of a performer and extracting all of first- to n-th-order tone sequence patterns; by the computer, calculating transition probabilities and appearance probabilities by calculating a transition probability for each of the extracted tone sequence patterns and appearance probabilities for all tone sequence patterns; and by the computer, structuring performance phrases by identifying tone sequence patterns which are statistically likely to occur based on the transition probabilities and the appearance probabilities and expressing the tone sequence patterns as music scores to thereby generate and output performance phrases of the performer.

According to a third principal aspect of the present invention, there is provided a computer software program stored in a storage medium for performing an improvisation performance analysis, said improvisation performance analysis executing the steps of: by a computer, extracting tone sequence patterns by analyzing music data storing an actual performance of a performer and extracting all of first- to n-th-order tone sequence patterns; by the computer, calculating transition probabilities and appearance probabilities by calculating a transition probability for each of the extracted tone sequence patterns and appearance probabilities for all tone sequence patterns; and by the computer, structuring performance phrases by identifying tone sequence patterns which are statistically likely to occur based on the transition probabilities and the appearance probabilities and expressing the tone sequence patterns as music scores to thereby generate and output performance phrases of the performer.

Note that characteristics of the present invention other than the claimed characteristics will be disclosed in the following description of the preferred embodiments and the accompanying drawings.

BRIEF DESCRIPTION OF THE DRAWINGS

FIG. 4A is a conceptual diagram describing transition probabilities and FIG. 4B is appearance probabilities according to the one embodiment of the present invention.

DETAILED DESCRIPTION OF THE INVENTION

One embodiment of the present invention will be described below based on the accompanying drawings.

1. Concept of the Present Invention

The present invention provides a method and a system for providing improvisation performance phrases unrestricted by music theories.

Here, the music theories are structured based on mathematical and/or physical logics, and music composed strictly according to the music theories comprises melody lines having beautiful notes with no cacophony, etc. In that sense, improvisation performances still need to be based on music theories to some extent.

However, in practice, an improvisation performer would normally play music based on the performer's intuition on each occasion relying on the performance techniques that the performer has acquired up to the moment, but would not always strictly think about validity in terms of the music theories while playing.

Therefore, one may say that music is fundamentally a creation of a brain except for the physical theories, and that improvisational melodies are created intuitively based on knowledge that the brain has acquired.

The present inventor completed the present invention based on the knowledge above.

In other words, the most fundamental learning mechanism of the brain is the statistical learning. The statistical learning refers to automatic and subconscious calculation and learning by a learner's brain regarding transition probability of sequence information, and it is unrelated to the learner's consciousness or intentions, wherein human's intuitions are said to be generated based on this potential statistical knowledge.

As such, the present invention statistically analyzes performance information of an improvisation performer and identifies characteristics of tone sequence patterns to extract phrases based on the characteristics. This way, phrases reflecting intuitive aspects of the improvisation performer may be obtained. Thus, learners may be able to directly acquire improvisation performance techniques created by "intuition," but not by "music theories."

The present invention is systemized based on the present inventor's knowledge discussed above.

2. System Structure According to the Present Embodiment

Figure 1:
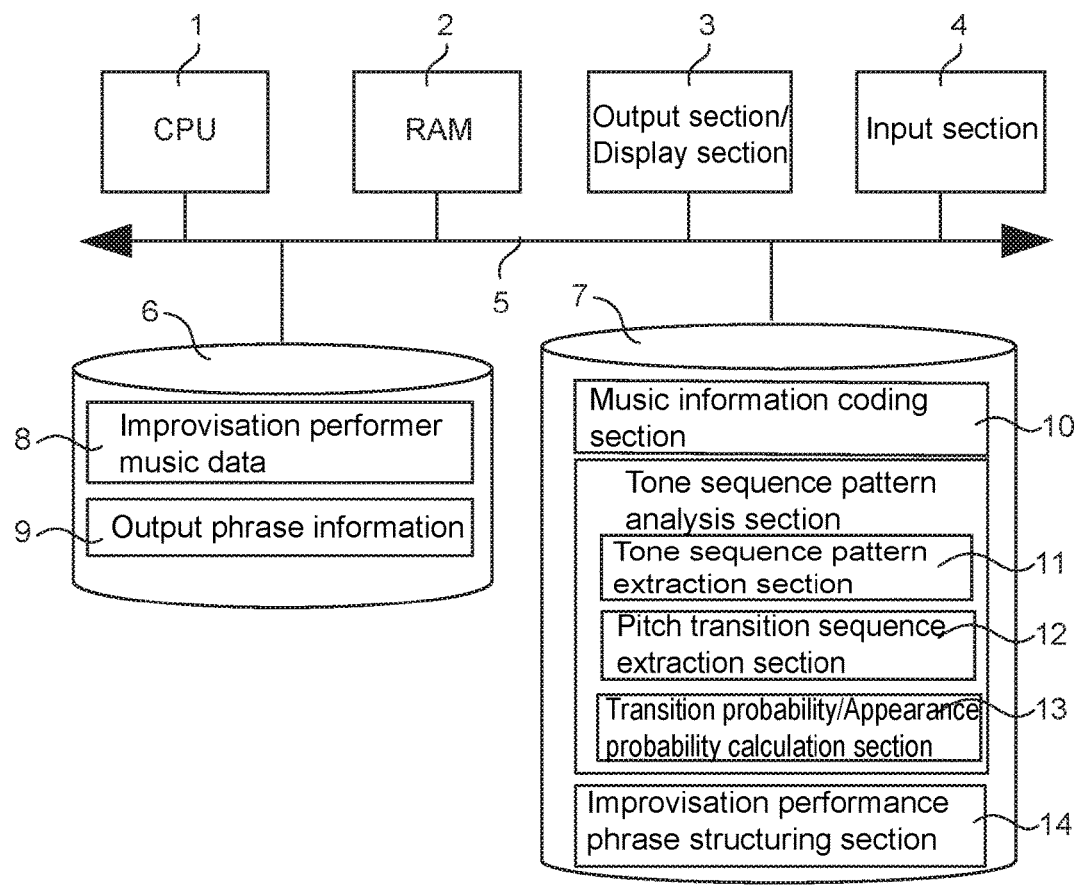
FIG. 1 is a schematic structural view showing one embodiment of the present invention.

FIG. 1 is a schematic structural view showing a system according to the present embodiment.

This system is defined by a CPU 1, a RAM 2, an output section/display section 3, an input section 4 and the like, all of which are connected to a bus 5, which is also connected to a data storage section 6 and a program storage section 7.

The data storage section 6 stores improvisation performer music data 8 as input data, and improvisation performance phrase information 9 as output data.

Aside from its basic programs, the program storage section 7 stores the following as programs related to the present embodiment:

(1) a music information coding section 10 for analyzing and coding music data of the improvisation performer stored in a music storage medium;

(2) a tone sequence pattern extraction section 11 for extracting all of first- to n-th-order tone sequence patterns which are likely to occur as n-th Markov chains in order to perform a stochastic analysis with a Markov model using the coded music data;

(3) a pitch transition sequence extraction section 12 for obtaining a pitch transition sequence for each of the extracted tone sequence patterns;

(4) a transition probability/appearance probability calculation section 13 for using the Markov model to calculate a transition probability of each pitch transition sequence and an appearance probability of each transition sequence at each of the first- to n-th-order hierarchical levels; and (5) an improvisation performance phrase structuring section 14 for rearranging the pitch transition probabilities at each hierarchical level based on the transition probabilities and the appearance probabilities, identifying pitch transition sequences which are statistically likely to occur and expressing the pitch transition sequences in all keys as music scores based on the twelve-tone equal temperament to thereby generate improvisation performance phrases.

Each of the above sections 10-14 is, in practice, computer software programs and is deployed on the RAM 2 and executed by the CPU 1 to thereby function as each component of the present invention.

Detailed configuration and function of each of the sections 10-14 will be disclosed below through the respective operations.

Figure 2:
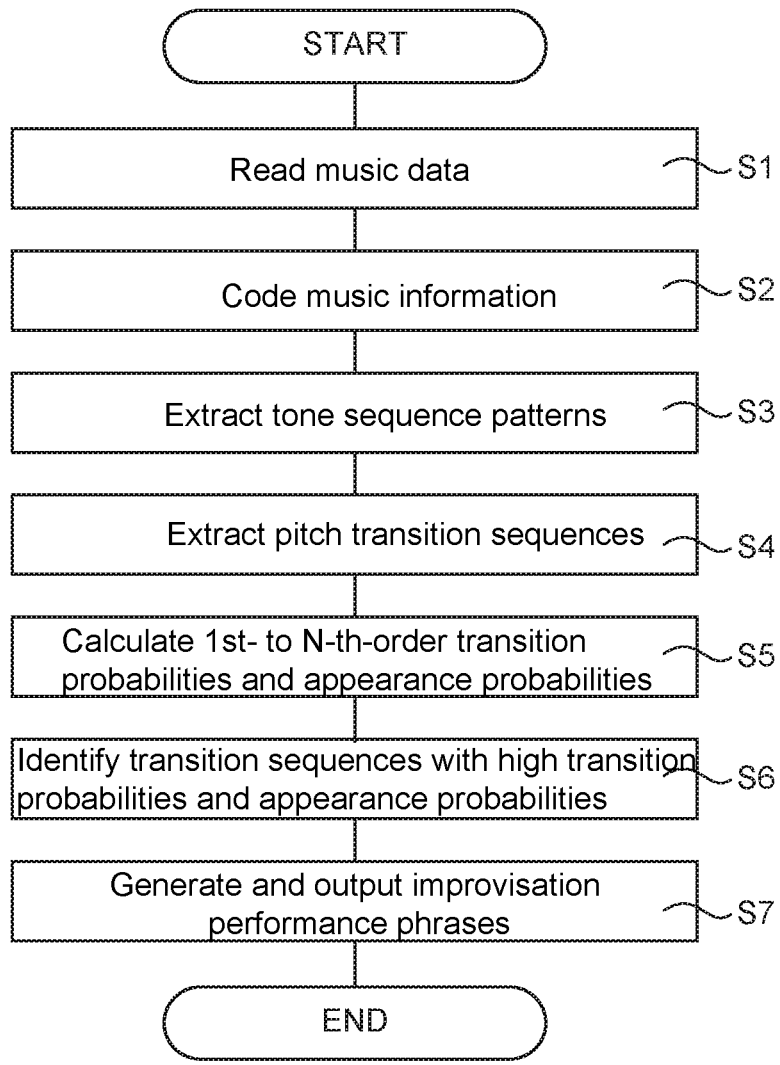
FIG. 2 is a flowchart showing the one embodiment of the present invention.

FIG. 2 is a flowchart showing processing steps by the above system. Note that S1-S6 in the figure are for indicating each processing step and correspond with each Step in the following, respectively.

(1) analyzing and coding music data of the improvisation performer stored in a music storage medium (Step S1, S2) (music information coding section 10)

The music data in, for example, MXL (Music XML file: a compressed music file in which a XML and other files are compressed) or MIDI format stored in the music storage medium (not shown) is often pitch notation information using alphabet letters such as C, F and E, or linguistic information. In order to statistically process the above information and calculate the transition probability, all of the information needs to be coded into numerical values.

Figure 3:
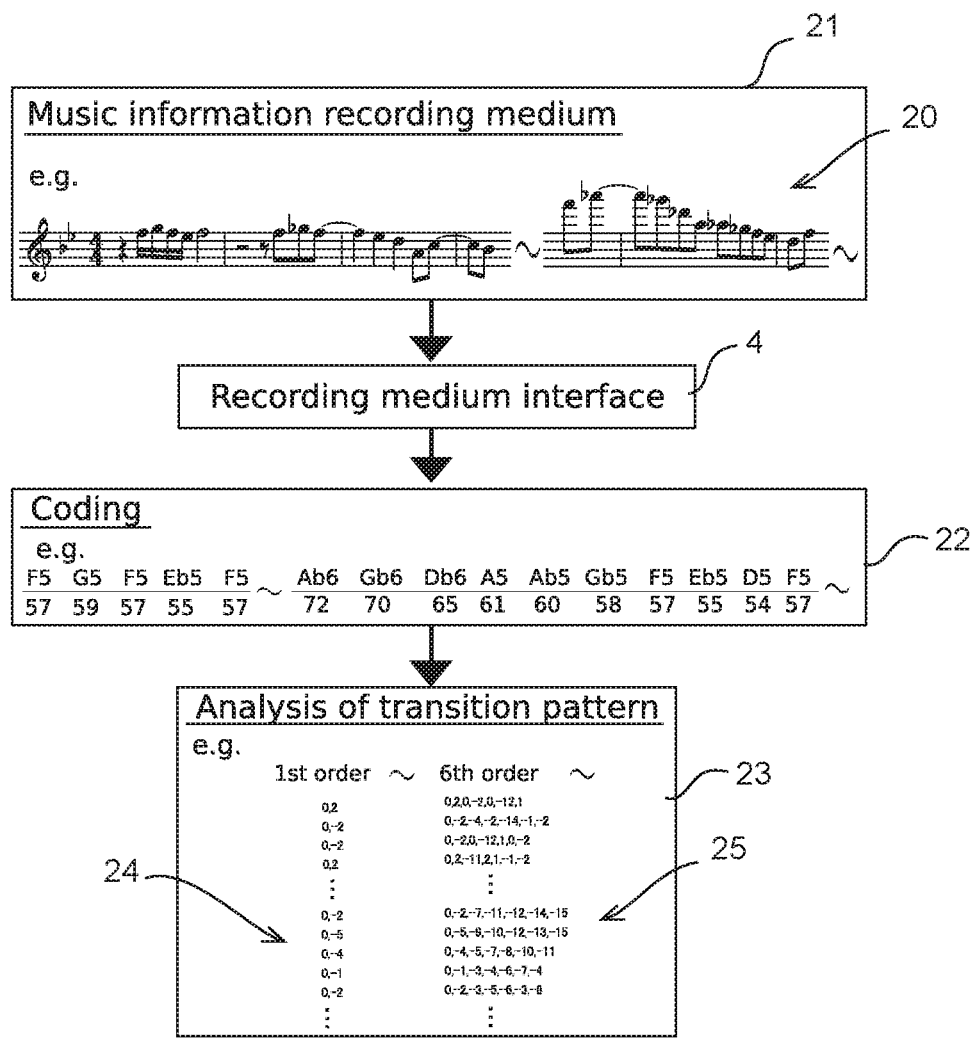
FIG. 3 is a conceptual diagram describing extraction of tone sequence patterns based on a Markov model according to the one embodiment of the present invention.

FIG. 3 is a schematic view describing the above coding.

In FIG. 3, music data corresponding with music score information denoted with 20 (raw music data played by an improvisation performer) is stored in, for example, a music storage medium 20 such as an SD card, and this music data is read by the system through the input section 4 such as a card reader and stored in the data storage section 6 (Step S1).

Next, the music information coding section 10 numerically analyses this music data and assigns one of the numbers 1-88 to each note based on the 88 piano key pitches with the lowest note corresponding with 1.

In FIG. 3, 22 illustrates the results of the above numerical assignment, wherein the upper row shows a case where the pitch information is denoted with the alphabet, and the lower row shows a case where the pitch information is denoted with numerical values. For example, the melody denoted with the reference number 21 may be represented with pitch notation as "F5, G5, F5, Eb5, F5 . . . " (the upper row of 22 in FIG. 2) or represented with the 88 numbers as "57, 59, 57, 55, 57 . . . " (the lower row of 22 in FIG. 2).

(2) extracting all of first- to n-th-order tone sequence patterns as likely n-th-order Markov chains in order to perform a stochastic analysis with the Markov model using the coded music data (Step S3) (tone sequence pattern extraction section)

Here, the Markov model refers to a stochastic model of time series data, where the probability of the current state is determined depending on the state which is n notes before the current state.

In the present embodiment, firstly, tone sequence patterns are extracted from the coded music data 22 for each hierarchy (first- to n-th-order).

For example, the first-order tone sequence patterns extracted from the coded music data 22 in the lower row "57, 59, 57, 55, 57 . . ." based on the Markov model are [57, 59], [59, 57], [57, 55], [55, 57] . . . . Also, the sixth-order tone sequence pattern is [57, 59, 57, 55, 57, (−45, 58)].

(3) obtaining a pitch transition sequence for each of the extracted tone sequence patterns (Step S4) (pitch transition sequence extraction section 12)

A key exists for each piece of music, and pitches of the entire piece and a role of each pitch change according to the key. In the present invention, in order to eliminate such music-specific rules, theories and the like, each transition pattern is assigned with numbers, wherein the initial pitch frequency is 0, a semitone increase is 1, and a semitone decrease is −1, and wherein only relative pitch changes are extracted starting with the initial tone of each transition pattern.

For example, when calculating with the first-order Markov model, the first-order tone sequence patterns [57, 59], [59, 57], [57, 55], [55, 57] . . . are converted to pitch transition sequences [0, 2], [0, −2], [0, −2], [0, 2] . . . with the initial tone designated as 0, as indicated with the left side 24 of output results denoted by 23 in FIG. 3. When calculating with the sixth-order Markov model, the sixth-order tone sequence pattern [57, 59, 57, 55, 57, (−45, 58)] . . . is converted to [0, 2, 0, −2, 0, (−12, 1)] . . . with the initial tone designated as 0, as indicated with the right side 25 of output results denoted by 23 in FIG. 3.

Accordingly, the pitch transition sequences are calculated for each hierarchy from the first Markov to n-th Markov orders.

(4) using the Markov model to calculate a transition probability of each pitch transition sequence and an appearance probability of each transition sequence for each of the first- to n-th-order hierarchical levels (Step S5) (transition probability/appearance probability calculation section 13)

First, in this process, in order to obtain transition sequences with high transition probabilities among the extracted transition sequences, the transition probability of each transition pattern is calculated using a multi-order Markov model.

The following Equation 1 shows a transition probability P, where the hierarchy is represented with n, the pitch of the coded transition pattern is X and the time is t.

$$\text{N-order Markov class: } P(X_t=x_t | X_{t-N}=x_{t-N}, X_{t-N+1}=x_{t-N+1}, \ldots, X_{t-1}=x_{t-1})$$  Equation 1

The transition probabilities of respective transition patterns obtained as above are summarized, and ultimately, some phrases with the highest appearance probability are identified and outputted.

How to obtain the transition probability and the appearance probability and significance thereof will be described in detail below.

Note that, since there are many number of rows in the example of actual music data shown in FIG. 3, a simplified example will be used in the following for ease of understanding.

The table of FIG. 4 (*a*) shows results obtained by the transition probability/appearance probability calculation section 13, wherein the six-th transition sequences are sorted and the transition probabilities obtained with Equation 1 are summarized. In other words, the first row of Table 1 sorts the cases where "0, 2, 4, 5, 7, 9" appears at the beginning of each transition sequence among all the sixth transition sequences and summarizes probabilities where transition to any one of "1," "2," "3" and "4" appears after "0, 2, 4, 5, 7, 9," respectively.

In this example, the probability that "0, 2, 4, 5, 7, 9" transitions to "1" is 10% of all the cases of "0, 2, 4, 5, 7, 9" transitioning to any one of "1," "2," "3" and "4." Similarly, the table shows the probability of transition to "2" being 30%, the probability of transition to "3" being 20% and the probability of transition to "4" being 40%.

Similarly, the second row represents the probability of "0, −1, −3, −5, −7, 8" transitioning to any one of "1," "2," "3" and "4" when "0, −1, −3, −5, −7, 8" appears. The third row represents the probability of "0, 2, 4, 2, 0, −1" transitioning to any one of "1," "2," "3" and "4" when "0, 2, 4, 2, 0, −1" appears.

Next, FIG. 4B shows appearance probabilities obtained by the transition probability/appearance probability calculation section 13 using the example of FIG. 4A against all transition patterns.

That is, the transition probabilities according to the above Markov model (the table of FIG. 4A) were obtained considering that the total probability of each row is 100%, whereas each of the appearance probability against all transitions (in the table of FIG. 4B) is calculated so that the sum of all appearance probabilities is 100%.

In other words, the probability that "0, 2, 4, 5, 7, 9" of the first row in FIG. 4A transitions to "1" is 10% of transition sequences starting with "0, 2, 4, 5, 7, 9," whereas the probability that "0, 2, 4, 5, 7, 9" transitions to "1" is 2.5% of all transition sequences of all rows in the same table. Accordingly, all of the appearance probabilities are obtained for their respective transition probabilities.

The above two calculations, namely, the calculations of the transition probabilities according to the Markov model and the respective transition probabilities for all of the transition probabilities make it possible to predict transition to which tone is likely next when one tone sequence appears previously (with the transition probabilities) (FIG. 4A) as well as how important that phrase is in the overall context (with the appearance probabilities) (FIG. 4B).

For example, in the table of FIG. 4A, the transition probabilities of "0, 2, 4, 5, 7, 9, 1" of the first row and "0, −1, −3, −5, −7, 8, 2" of the second row are both 10% based on the Markov model, but their respective appearance probabilities differ in the entirety as shown in FIG. 4B with 2.5% for "0, 2, 4, 5, 7, 9, 1" of the first row and 5% for "0, −1, −3, −5, −7, 8, 2" of the second row.

In other words, compared to the tone sequence "0, 2, 4, 5, 7, 9, 1," the tone sequence "0, −1, −3, −5, −7, 8, 2" may be considered to be a more important phrase in that particular piece of music. Thus, by using these two calculation methods, the accuracy of extracting import phrases may be improved.

Figure 5:
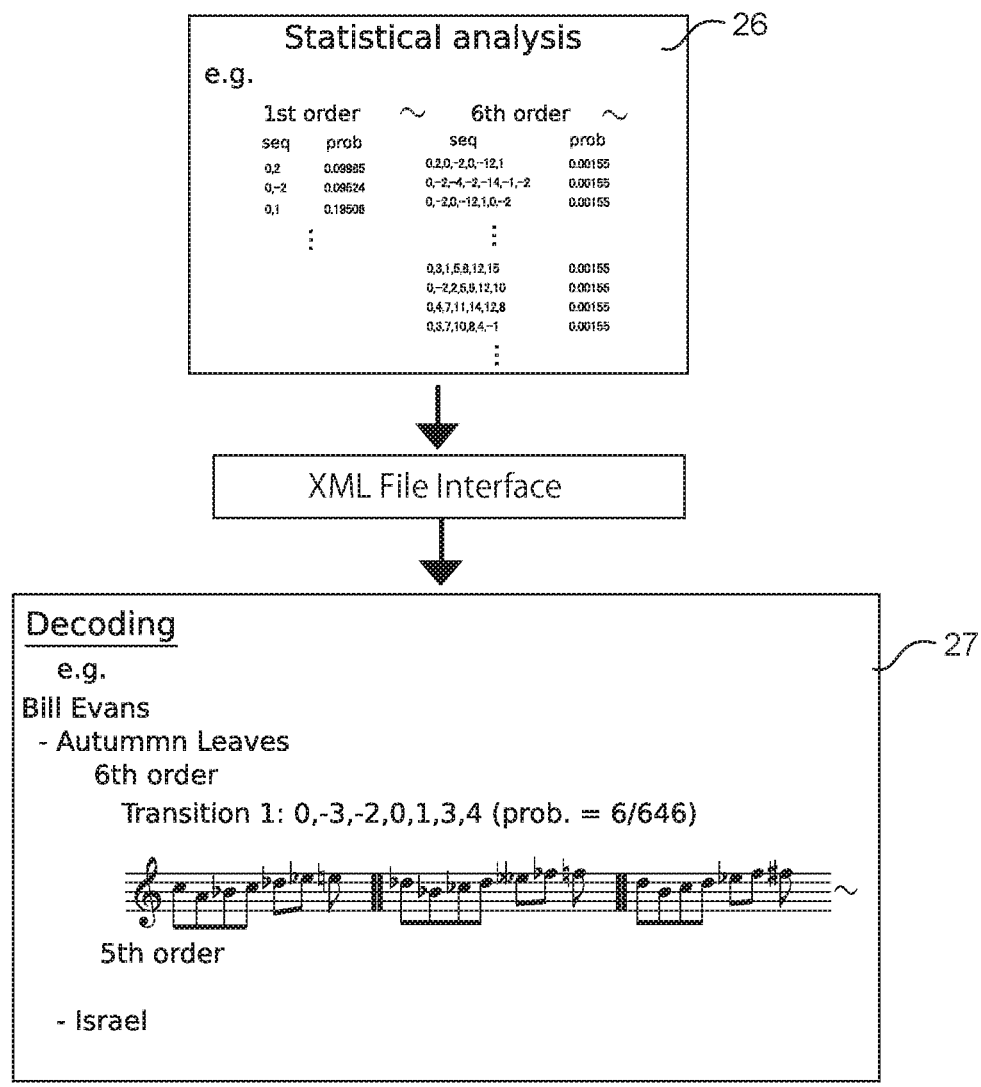
FIG. 5 is a conceptual diagram describing generation of improvisational phrases according to the one embodiment of the present invention.

In FIG. 5, the reference number 26 denotes the appearance probabilities in the example of FIG. 3. Here, "seq" shows each transition pattern and "prob" shows each appearance probability.

For instance, in this example, the appearance probability of the first transition pattern, "0, 2, 0–2, –2, 1" of the sixth-order transition patterns is 0.00155.

(5) rearranging the pitch transition probabilities at each hierarchical level based on the transition probabilities and the appearance probabilities, identifying pitch transition sequences which are statistically likely to occur and expressing the pitch transition sequences in all keys as music scores based on the twelve-tone equal temperament to thereby generate improvisation performance phrases (Step S6, S7) (improvisation performance phrase structuring section 14)

(5-1) First, based on the transition probabilities and the appearance probabilities, the transition sequences are sorted by the statistical likelihood from the highest to the lowest and outputted in an XML file (Step S6).

According to the above processing, it may be considered that the transition sequences with high transition and appearance probabilities tend to be intuitively played in improvisation performances. In the present embodiment, in order to understand how intuitive improvisation performances are played, the improvisation performance phrase structuring section 14 sorts transition sequences by transition probability and appearance probability, respectively, in descending order for each piece of music and for each performer, and adopts the top ten transition sequence patterns, respectively.

Next, the numerical values of the transition patterns need to be converted to pitch notation information since it is difficult to musically understand the transition patterns as phrases by the numerical values. As described above, the present invention eliminates music-specific laws and theories such as keys and only extracts relative transitions of pitches to thereby enable expressing each transition pattern in all keys (twelve-tone equal temperament). For example, when a transition pattern "0, –3, –2, 0, 1, 3, 4" is extracted, 0 may be assigned to the twelve pitch notations or note names "do," "re," . . . "ti." Then, the information converted from each transition pattern to all keys as above is outputted in an XML file.

(5-2) expressing each of the transition sequences in all keys as music scores based on the twelve-tone equal temperament (Step S7)

Next, the improvisation performance phrase structuring section 14 performs processing to generate music scores based on the outputted XML file. In FIG. 5, denoted with 27 is an output example, wherein an improvisation performance of the music "Autumn leaves" by the performer Bill Evans has been calculated using the sixth-order Markov model to obtain an appearance probability of 6/646 for a transition pattern "0, –3, –2, 0, 1, 3, 4," which is expressed as phrases in each key (C, Db, D . . . ). In the present embodiment, the improvisation performance phrase structuring section 14 presents such an output for each performer and each piece of music at the level of each hierarchy (first- to n-th-order Markov models).

According to such a structure, this system enables phrases based on subconscious statistical knowledge, which is the mechanism for creating the "intuition" needed for improvisation performance techniques. By employing this system, learners may be able to directly acquire more intuitive improvisation performance phrases.

It should be noted that the present invention is not limited to the above one embodiment, and that various changes and modifications may be made without departing from the spirit and scope of the present invention.

For example, tone sequences with high transition probabilities and appearance probabilities have been statistically analyzed using the Markov model in the above, but the model is not limited to the Markov model. Other statistical methods may be used.

Also, the transition probabilities and the appearance probabilities may be obtained taking account of other elements. For example, the same piece of music may be assigned with different weights depending on the performer. Additionally, even for the same performer, the transition probability and the appearance probability may be calculated with different weight constants depending on the piece of music, the year or the like.

What is claimed is:

1. An improvisation performance analysis system, comprising:
   a tone sequence pattern extraction section for analyzing music data storing an actual performance of a performer and extracting all of first- to n-th-order tone sequence patterns;
   a pitch transition sequence generation section for generating pitch transition sequences which correspond to the extracted first- to n-th-order tone sequence patterns, each of the pitch transition sequences being generated by converting a corresponding one of the tone sequence patterns to a relative pitch-interval sequence starting with an initial tone of the tone sequence pattern,
   a transition probability/appearance probability calculation section for calculating a transition probability for each of the pitch transition sequences and an appearance probability of each of the pitch transition sequences relative to all of the pitch transition sequences;
   a performance phrase structuring section for identifying pitch transition sequences which are statistically likely to occur based on the transition probabilities and the appearance probabilities, and outputting performance phrases of the performer by expressing the identified pitch transition sequences as a music score.

2. The performance analysis system of claim 1, wherein the performance of the performer is an improvisation performance.

3. The performance analysis system of claim 1, wherein the tone sequence pattern extraction section extracts all of first- to n-th-order tone sequence patterns which are likely to occur as n-th Markov chains, and wherein the transition probability/appearance probability calculation section uses a Markov model to obtain a transition probability of each pitch transition sequence at each of the first- to n-th-order hierarchical levels.

4. The performance analysis system of claim 1, wherein the music data is in an XML, file.

5. The performance analysis system of claim 1, wherein the music data is from a MIDI sound generator.

6. The performance analysis system of claim 1, wherein the performance phrase structuring section generates the music score by expressing the identified pitch transition sequences in all keys based on the twelve-tone equal temperament.

7. A method for analyzing improvisation performances, comprising the steps of:
   by a computer, extracting tone sequence patterns by analyzing music data storing an actual performance of a performer and extracting all of first- to n-th-order tone sequence patterns;

by a computer, generating pitch transition sequences which correspond to the extracted first- to n-th-order tone sequence patterns, each of the pitch transition sequences being generated by converting a corresponding one of the tone sequence patterns to a relative pitch-interval sequence starting with the initial tone of the tone sequence pattern, by the computer, calculating a transition probability for each of the pitch transition sequences and an appearance probability of each of the pitch transition sequences relative to all of the pitch transition sequences; and by the computer, structuring performance phrases by identifying pitch transition sequences which are statistically likely to occur based on the transition probabilities and the appearance probabilities, and outputting performance phrases of the performer by expressing the identified pitch transition sequences as a music score.

8. The method of claim 7, wherein
the performance of the performer is an improvisation performance.

9. The method of claim 7, wherein
the step of extracting tone sequence patterns extracts all of first- to n-th-order tone sequence patterns which are likely to occur as n-th Markov chains, and wherein
the step of calculating transition probabilities and appearance probabilities obtains a transition probability of each pitch transition sequence at each of the first- to n-th-order hierarchical levels using a Markov model.

10. The method of claim 7, wherein the structuring of performance phrases generates the music score by expressing the identified pitch transition sequences in all keys based on the twelve-tone equal temperament.

11. A computer software program stored in a storage medium for performing an improvisation performance analysis, said improvisation performance analysis executing the steps of:

by a computer, extracting tone sequence patterns by analyzing music data storing an actual performance of a performer and extracting all of first- to n-th-order tone sequence patterns;

by a computer, generating pitch transition sequences which correspond to the extracted first- to n-th-order tone sequence patterns, each of the pitch transition sequences being generated by converting a corresponding one of the tone sequence patterns to a relative pitch-interval sequence starting with an initial tone of the tone sequence pattern, by the computer, calculating a transition probability for each of the pitch transition sequences and an appearance probability of each of the pitch transition sequences relative to all of the pitch transition sequences; and by the computer, structuring performance phrases by identifying pitch transition sequences which are statistically likely to occur based on the transition probabilities and the appearance probabilities, and outputting performance phrases of the performer by expressing the identified pitch transition sequences as a music score.

12. The computer software program of claim 11, wherein the performance of the performer is an improvisation performance.

13. The computer software program of claim 11, wherein
the step of extracting tone sequence patterns extracts all of first- to n-th-order tone sequence patterns which are likely to occur as n-th Markov chains, and wherein
the step of calculating transition probabilities and appearance probabilities tone sequence obtains a transition probability of each pitch transition sequence at each of the first- to n-th-order hierarchical levels using a Markov model.

14. The computer software program of claim 11, wherein the structuring of performance phrases generates the music score by expressing the identified pitch transition sequences in all keys based on the twelve-tone equal temperament.

* * * * *